May 15, 1923.
A. CAMPBELL
DUMP CAR
Original Filed Jan. 30, 1922    2 Sheets-Sheet 1
1,455,520
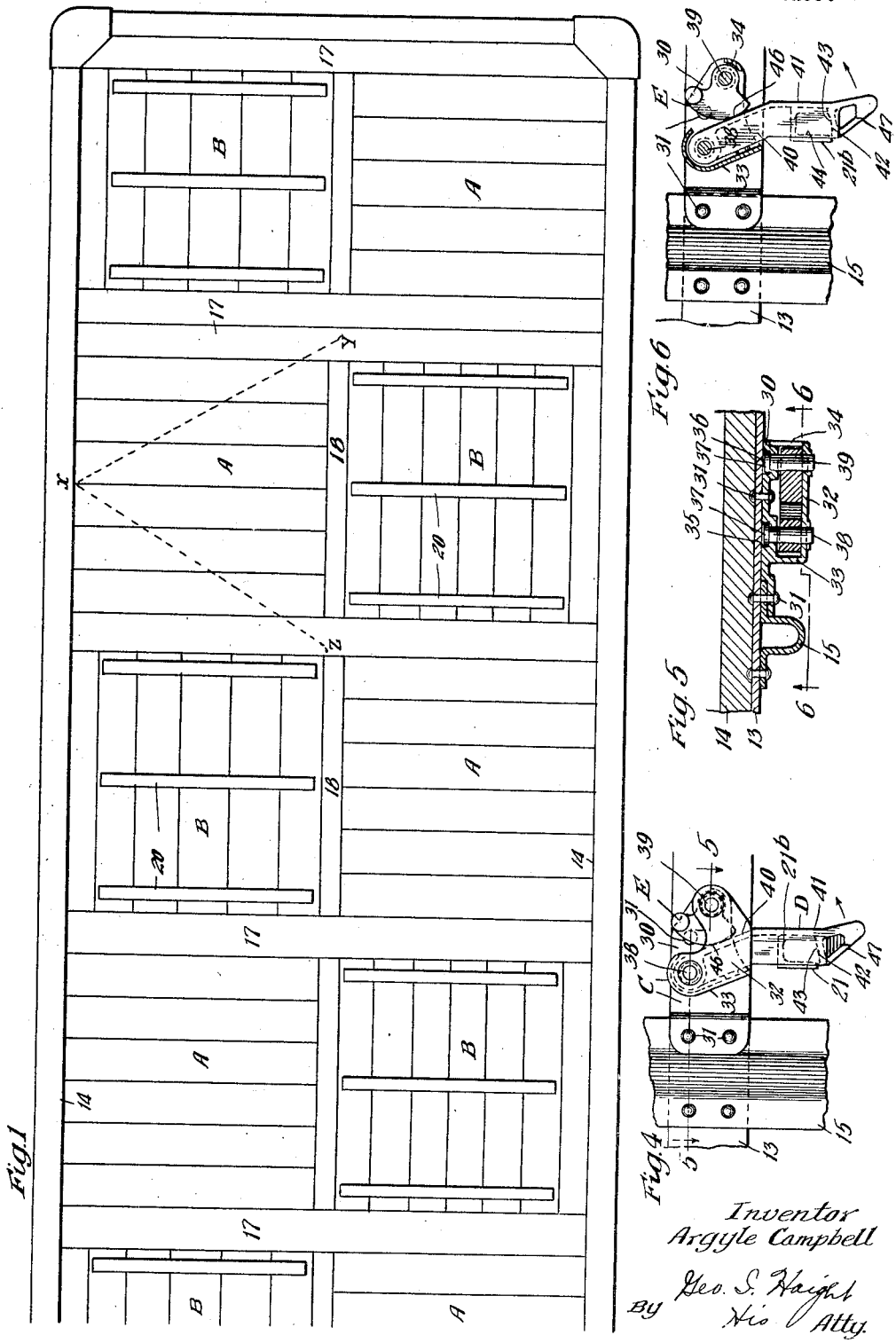
Inventor
Argyle Campbell
By Geo. S. Haight
His Atty.

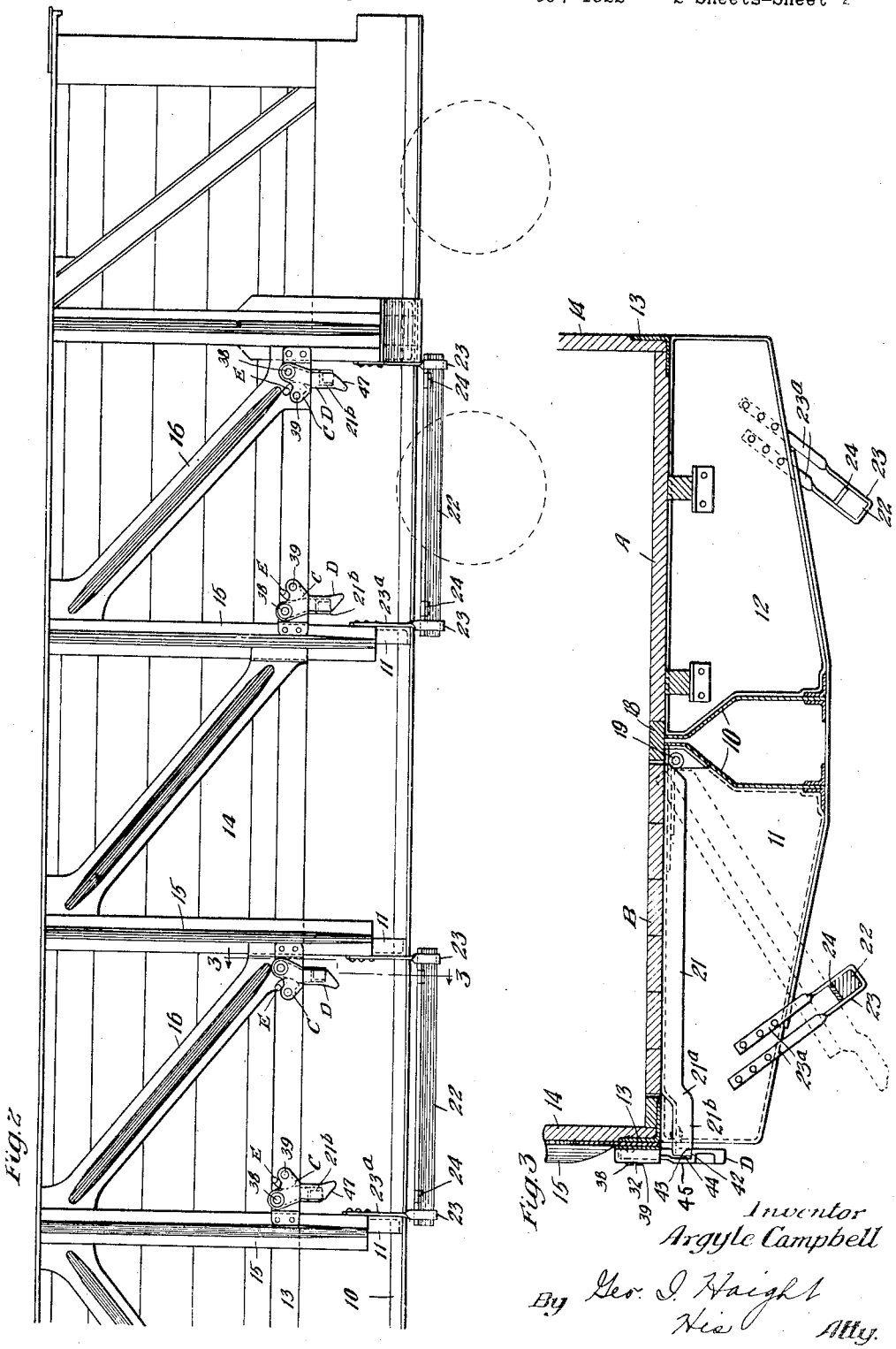

Patented May 15, 1923.

1,455,520

UNITED STATES PATENT OFFICE.

ARGYLE CAMPBELL, OF CHICAGO, ILLINOIS, ASSIGNOR TO ENTERPRISE RAILWAY EQUIPMENT COMPANY, OF CHICAGO, ILLINOIS, A CORPORATION OF ILLINOIS.

DUMP CAR.

Application filed January 30, 1922, Serial No. 532,734. Renewed February 16, 1923.

*To all whom it may concern:*

Be it known that I, ARGYLE CAMPBELL, a citizen of the United States, residing at Chicago, in the county of Cook and State of Illinois, have invented a certain new and useful Improvement in Dump Cars, of which the following is a full, clear, concise, and exact description, reference being had to the accompanying drawings, forming a part of this specification.

This invention relates to improvements in dump cars.

In the general service type of dump car, it is customary to employ 16 pivoted side dump floor doors, eight on each side of the center sill and extending the full length of the car, together with door mechanisms for the doors which are relatively expensive. The general practice in such door mechanism is to employ two shafts on each side of the car, one shaft for four doors, with which are required appropriate lowering and lifting devices for each of the doors. In the general service type of car, the dumping capacity is approximately 99%.

One object of my invention is to provide a car which is very materially cheaper to manufacture than a strictly true general service car of the same size and capacity, particularly as regards the door operating mechanisms, and the cost of the doors and fittings therefor, while at the same time adapting the car for general service use, and in which approximately 87% of the load may be dumped.

Another object of the invention is to provide a car of the general service character, but in which the number of doors is materially reduced, accompanied by only a comparatively slight reduction in the dumping rating of the car.

Other objects of the invention relate to certain improvements in means for locking the doors in closed position and means for limiting the opening movements of the doors.

In the drawings forming a part of this specification, Figure 1 is a top plan view of a dump car showing my improvements, slightly more than one-half the length of the car being illustrated. Fig. 2 is a side elevation of the car illustrated in Fig. 1. Fig. 3 is an enlarged transverse sectional view corresponding substantially to the section line 3—3 of Fig. 2. Fig. 4 is an enlarged side elevational view illustrating one of the improved door locking devices or latches. Fig. 5 is a horizontal sectional view corresponding to the section line 5—5 of Fig. 4. And Fig. 6 is a vertical sectional view corresponding to the section line 6—6 of Fig. 5.

In said drawings, the car is shown as provided with an underframe comprising a ridge shaped center sill 10, cross members, or diaphragms, or needle beams 11 and 12, angle iron side sills 13, side walls 14, side stakes 15, diagonal braces 16, transversely extending cover plates 17 over the cross members and longitudinally extending cover plates or boards 18 over the center sill.

Referring more particularly to Figs. 1 and 3, it will be noted that the bottom of the car is flat throughout and is composed of alternated, fixed floor sections A and drop bottom doors B. In Fig. 1, slightly more than one-half of the car is shown, from which it will be observed that I provide four doors on each side of the car alternated with four fixed floor sections. Referring still to Figs. 1 and 3, it will be noted that the fixed floor sections A on one side of the center sill are transversely opposite the floor doors B on the other side of the center sill so that the bottom of the car may be described as composed of alternated and staggered fixed floor sections and pivoted doors.

As shown in Fig. 3, the floor doors B are pivoted along their inner edges as indicated at 19 to suitable hinge butts preferably attached to the center sill, or to the latter and the cross members of the underframe. Each of the doors B preferably consists of a plurality of longitudinally extending boards or planks secured together on the upper sides by a plurality of plates or straps 20, and braced on the underside by a pair of transversely extending beams 21—21. Each of the latter, at the outer free edge of the door, is downwardly deflected as indicated at 21$^a$ and then extends outwardly horizontally as indicated at 21$^b$ beyond the plane of the side wall 14, for the purposes hereinafter described.

By staggering and alternating the doors and fixed floor sections as above described, I am enabled to reduce the number of doors to one-half as compared with the usual general service car, thereby reducing the cost of manufacture, inasmuch as I eliminate one-half of the door hinges, door braces and straps, and the cost of the door operating mechanism is correspondingly reduced. In this connection it will, of course, be understood by those skilled in the art that the cost of a fixed floor section is very much less than that of a door because of the absence of the door fittings, and the labor required in assembling the door.

Although in my improved car I reduce the number of floor doors to one-half as compared with the usual general service car, nevertheless, the decrease in dumping capacity or rating is very much less and, in fact, so small as to not interfere with the efficient use of the car as a general service car. The reason why the dumping capacity or rating is not reduced in proportion to the reduction in the number of doors will be better understood from reference to Fig. 1 where it will be noted that I have indicated 2 lines $x$—$y$ and $x$—$z$ over one of the fixed floor sections A. When two doors on the opposite sides of a fixed floor section on the same side of the center sill are opened, not only will the load immediately above the doors be discharged, but a considerable percentage of the load over the intervening fixed floor section will be discharged to each side in the case of ordinary loads in bulk, such as sand, gravel, stone, coal and the like. Furthermore, when the floor door transversely opposite the fixed floor section is opened, another portion of the load over the fixed floor section will be discharged to the opposite side of the car, thereby leaving only a very small percentage of the original load over the fixed floor section in the car, which is required to be shoveled out. The lines $x$—$y$ and $x$—$z$ indicate approximately and diagrammatically the outline of the portion of the load which would be left on the fixed floor section, it being understood that the remaining pile slopes downwardly from the line $x$—$y$ to the right, and from the line $x$—$z$ to the left and between the lines $x$—$y$ and $x$—$z$ downwardly toward the center of the car. For average bulk loads, the decrease in dumping capacity or rating will be approximately from 99% for the strictly true general service type of car to approximately 87% in my improved car.

In my improved type of car, as illustrated, certain of the floor doors will come over the trucks and, therefore, it is desirable to limit the downward movement thereof in opening so as to avoid having the doors strike the wheels or trucks. It is also desirable to limit the opening movement of all of the doors to prevent the same falling against other parts of the car or attachments on the underframe, or dragging on the roadbed. For this purpose I have shown a very simple and inexpensive arrangement which is best illustrated in Fig. 3. As will be clear from the preceding description considered in connection with the drawings, each door extends from one needle beam to the next adjacent needle beam or cross member. Beneath each door I locate a longitudinally extending bar 22, preferably composed of wood on account of its yielding qualities to lessen the shocks when the door strikes it. Each of said bars 22 is supported at its ends by means of a U-shaped strap 23 shaped to snugly fit and receive the bar 22, the upper ends of the side arms of the strap being twisted at right angles to the bottom central portion, as indicated at $23^a$—$23^a$, and the latter in turn being riveted or otherwise rigidly secured to the adjacent needle beam or cross member 11. It is a common practice to make the cross members of a car underframe in the form of steel pressings with flanges on one side thereof. To lessen the expense and avoid difficulties in the attachment of straps 23, I arrange the flanges of the cross members 11 and 12 on the same side of the car alternately, that is, the two pressed cross members on the opposite sides of a pivoted door have their flanges turned away from each other, thereby leaving a perfectly flat side adjacent the door to have attached thereto the straps 23. The flanges of the pressed cross members will, therefore, extend inwardly or toward the fixed floor sections in every instance, this being clearly illustrated in Fig. 3 wherein the flange on the cross member 11 at the left hand side of the center sill is on the far side whereas the flange of the cross member 12 on the right hand side of the center sill is on the near side as viewed in said figure.

Preferably the bars 22 are provided with suitable hardened wear plates 24 on their upper sides in line with the door braces 21 so that wear on the bars is minimized and the shock is transmitted to the door through the braces 11. The stop arrangement which I have shown is more or less resilient, is efficient in operation, superior to the usual angled flange employed for a similar purpose, and the strap attachment permits of the doors being stopped at any desired point, it being evident that the straps are extended below the bottom edges of the cross members or diaphragms. It will also be noted that the straps are placed so as to extend at right angles to the plane of the door when the latter is in its opened position, thus placing the strap purely under tension and rendering it most efficient.

In order to eliminate the use of expensive shafts and the usual flexible door raising and lowering devices, I employ locking latches, two for each door as shown in Fig. 2. The details of one of said latches, which are arranged right and left so as to swing toward each other as clearly shown in Fig. 2, are best illustrated in Figs. 4, 5 and 6. Each of said locking devices comprises, broadly, a bracket or support C; a lever latch D; and a locking cam E.

The bracket C, preferably a casting, is provided with a main back wall or web 30, which, when the bracket is in position, bears against and is secured to the side wall structure of the car as by a series of three rivets 31—31. To provide a housing and also to prevent outward bending or movement of the latch and locking cam, the bracket C is formed with an outer wall or web 32 united to the main wall or web 30 by flanges 33 and 34. The contour of the web or wall 32 is irregular and preferably of the outline shown best in Fig. 4. The latch and locking cam are housed between the walls or webs 30 and 32, the swinging movement of the lever latch D in a closing or operative direction being limited by said flange 33, as shown in Fig. 6. The swinging movement of the cam E to its inoperative position, is likewise limited by the same engaging the flange 34.

I have provided a novel and efficient means for pivotally supporting the latch and cam. In the back wall or web 30 of the bracket C, are provided depressions or circular recesses 35 and 36, the back wall at these points being thickened to allow for said recesses 35 and 36 without weakening the casting. The recesses 35 and 36 accommodate the heads 37 of heavy pivot pins 38 and 39 for the latch and cam respectively, the shanks of said pins being extended horizontally outwardly through alined openings in said back wall 30 and outer wall 32 as clearly illustrated in Fig. 5. In this manner the pivot pins 38 and 39 are positively held against displacement after the locking device is in position, inasmuch as the heads of the pins are confined between the bracket and the adjacent fixed portions of the car structure. With this arrangement, the pins are stronger and less subject to bending and shear than if the same were extended entirely through the bracket into the side wall structure of the car. The latch lever D is formed with a shank having the upper portion thereof 40 sloping downwardly and from its pivotal support toward the opposite latch of the same set, the lower portion of the shank as indicated at 41 extending vertically when the latch is in operative position. At the bottom of the shank, is formed a bearing or locking face 42 which is curved on a relatively long radius about a center eccentric to the axis of the pivotal connection of the latch so that said curved bearing face 42 when it is pushed home against a corresponding curved bearing face 43 provided on the bottom of a block 44 secured to the outer end 21$^b$ of the door brace, will have a wedging effect in pushing the door to fully closed position. It will also be noted that the shank of the latch D is of right angular cross-section with one flange extending in planes transverse of the car and the other or outer flange extending parallel to the car and overlapping the end of the door brace and block 44 when in operative position.

The locking cam E is of the usual type, having a cam surface adapted to engage with a flat surface 46 on the portion 40 of the shank of the latch lever.

As will be understood by those skilled in the art, the doors are adapted to be lifted by hand or by means of a suitable lever engaged with a socket or bracket on the underside of the door and lifted to closed position. As the doors approach their closed position, the projecting ends 21$^b$ engage the beveled lower ends 47 of the latch levers D thereby pushing the latter so as to clear the extensions 21$^b$ until the latter are sufficiently elevated for the locking faces 42 of the latch levers to swing under the locking faces 43 under the influence of gravity.

With my arrangement of locking latches, it is evident that the expense for the door operating means is very materially reduced as compared with prior arrangements, commonly employed on general service cars, so that this reduction of the expense in conjunction with the reduced cost of the doors and fittings, makes the entire car an extremely inexpensive one to manufacture.

I have herein shown and described what I now consider the preferred manner of carrying out the invention, but the same is merely illustrative and I contemplate all changes and modifications that come within the scope of the claims appended hereto.

I claim:

1. A dump car having a flat bottom, the said flat bottom on each side of the center having alternated floor doors and fixed floor sections, the doors on one side of the car being transversely opposite the fixed floor sections on the other side of the car.

2. A dump car having a flat bottom, said flat bottom having alternated and staggered floor doors and fixed floor sections.

3. A dump car having a flat bottom composed entirely of alternated floor doors and fixed floor sections on each side of the center, the doors on one side of the center being transversely opposite the fixed floor sections on the other side of the center.

4. A dump car having a flat bottom, said flat bottom having side dump floor doors pivoted at the center sill, the doors being separated by fixed floor sections and the doors on one side of the center being transversely opposite the fixed floor sections on the other side of the center.

5. A dump car having a flat bottom composed entirely of alternated, pivoted side dump doors and fixed floor sections, the doors on one side of the center of the car being transversely opposite the fixed floor sections on the other side of the center.

6. In a dump car, the combination with an under-frame comprising a center sill and cross-members; of a side dump floor door, pivoted along its inner edge at the center sill; and means for limiting the opening movement of said door, including, a bar beneath the door and extending lengthwise of the car from one cross member to the next adjacent cross member.

7. In a dump car, the combination with an underframe comprising a center sill and cross members; of a side dump floor door, pivoted along its inner edge at the center sill; means for limiting the opening movement of said door, including, a bar beneath the door and extending lengthwise of the car from one cross member to the next adjacent cross member; and means for supporting said bar from and below the cross member comprising straps secured to the cross members and extending downwardly therefrom.

8. In a dump car, the combination with an underframe comprising a center sill and cross members; of a side dump floor door, pivoted along its inner edge at the center sill; means for limiting the opening movement of said door, including, a bar beneath the door and extending lengthwise of the car from one cross member to the next adjacent cross member; and means for supporting said bar from and below the cross members comprising straps of U-shape having the ends of the arms thereof secured to the cross members, said straps extending downwardly from the cross members at an angle substantially perpendicular to the plane of the door when it is in its open position.

9. In a dump car, the combination with an underframe comprising a center sill and cross members; of a side dump floor door pivoted along its inner edge at the center sill, said door having bracing beams on the underside thereof extending from the inner pivoted edge to the outer free edge of the door; and a longitudinally extending bar beneath the door, engageable by the undersides of said bracing beams to limit the opening movements of the door.

10. In a dump car, the combination with an underframe comprising a center sill and cross members; of a side dump floor door pivoted along its inner edge at the center sill; U-shaped straps secured to and depending from the cross members on each side of the door; and a wood bar supported at its ends in said straps and extending lengthwise of the car and adapted to limit the opening movement of the door.

11. A dump car having side and end walls and a bottom, said bottom having alternated and staggered dumping doors and fixed floor sections.

12. In a dump car, the combination with an underframe having a center sill and cross members; of a dump floor door pivoted along one of its edges; and means for limiting the opening movement of said door including, a bar beneath the door and extending parallel to the pivotal axis of the door and secured at its ends to fixed portions of the car underframe.

In witness that I claim the foregoing I have hereunto subscribed my name this 7th day of January, 1922.

ARGYLE CAMPBELL.

Witnesses:
 UNA C. GRIGSBY,
 ANN BAKER.